July 8, 1941.　　　　T. O. KOSATKA　　　　2,248,761

OIL SEAL

Filed Jan. 23, 1939

INVENTOR.
Thomas O. Kosatka,
Parkinson & Lane
ATTORNEYS.

Patented July 8, 1941

2,248,761

UNITED STATES PATENT OFFICE 2,248,761

OIL SEAL

Thomas O. Kosatka, Chicago, Ill., assignor to Victor Manufacturing & Gasket Company, Chicago, Ill., a corporation of Illinois Application January 23, 1939, Serial No. 252,319

2 Claims. (Cl. 288—3)

The present invention relates to a novel oil seal especially adapted to be mounted upon or rotatably associated with a shaft or rotatable member for sealing the opening or space existing between the rotatable member and its housing or surrounding structure. Such an oil seal comprises a shell or casing adapted to be securely mounted upon or associated with a rotating shaft and provided with a sealing element for effectively preventing the escape of lubricants or other fluids through the opening provided in a stationary housing or casing through which the rotating shaft passes, and further excluding dust or other foreign particles from such opening.

In oil seals of the type employing a bearing surface having a plastic base, difficulty is experienced in preventing creeping of this plastic material. This creeping, elongation or distortion in normal operation, frequently results in a binding or jamming of the plastic base against the shell, due to the limited clearance between this sealing element and retaining shell or support.

One of the objects of the present invention is to prevent or limit the creeping tendency of the plastic base. In the present disclosed embodiment, this is accomplished by incorporating in the sealing member an intermediate layer of fabric which provides a bond or support for the plastic material forming the bearing surface and effectively maintains the contour of this bearing surface under operating conditions.

Due to the novel construction of the present oil seal and more especially to the novel sealing element, the invention provides a most effective seal against the escape or passage of lubricants, water and other cooling fluids, and excludes dust or other foreign particles.

The invention further resides in the combination, construction and arrangements of parts illustrated in the accompanying drawing, and while there is shown therein a preferred embodiment, it is to be understood that the same is susceptible of modification and change and comprehends other details and constructions without departing from the spirit of the invention.

Figure 3:
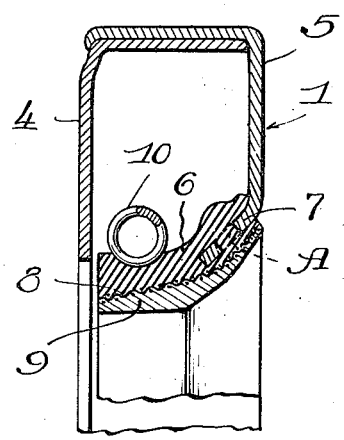
Figure 3 is a fragmentary enlarged view in vertical cross-section of the novel oil seal.

Referring more particularly to the disclosure in the drawing, the embodiment selected to illustrate the invention comprises an oil seal 1 adapted to be mounted in a casing or housing 2 surrounding a rotatable shaft 3. The novel seal construction includes a sectional shell or retainer consisting of an inner section 4 and an outer section 5 suitably attached or secured together to form a unitary assembly. To a side wall of the shell or retainer is molded an elastic plastic material 6 preferably of synthetic rubber. This material 6, as more particularly shown in Fig. 3 of the drawing, is intimately molded or secured to the inner and outer surface of the section 5 and its inwardly projecting flange 7, and additionally anchored in openings A provided in the flange. Molded directly to the plastic layer 6 is an intermediate layer of fabric 8, such as cotton duck or other suitable fabric or fibrous material, and a layer of elastic plastic material 9. The plastic layer 6, intermediate fabric layer 8 and outer plastic layer 9 are intimately molded or vulcanized to form an integral sealing element.

Figure 1:
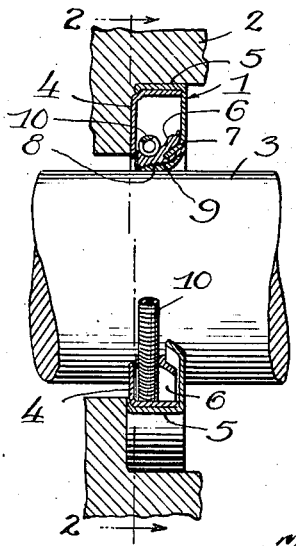
Figure 1 is a view in vertical cross-section through the novel oil seal and showing the seal mounted in a stationary housing or casing encompassing a rotating shaft.
Figure 2:
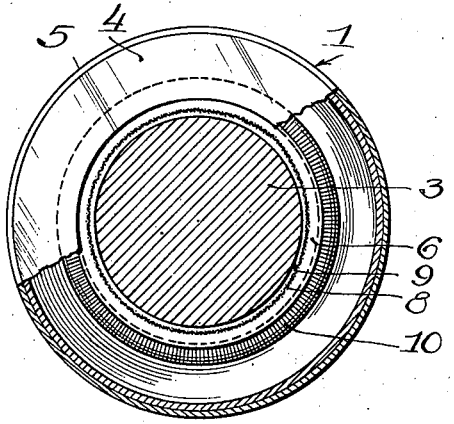
Figure 2 is a view part in side elevation and part in vertical cross-section of the seal taken on the line 2—2 of Fig. 1.

The layer 9, as more clearly shown in Fig. 1, is in direct frictional contact with the shaft 2 and is maintained in such contact by the elasticity or resiliency of the sealing element and by means of a spring 10 preferably in the form of a contractile or garter spring adapted by its inwardly directed pressure to force and maintain the sealing element into frictional or wiping contact with the shaft when employed as an internal seal. It will be readily apparent that by a mere reversal of the parts, the shell or retaining casing for the seal may be mounted on the shaft and the sealing element forced into a sealing contact with the wall or casing surrounding the shaft. In order to enhance the frictional characteristics or properties of the layer 9, I preferably load this layer with graphite.

For the elastic plastic material, I preferably employ one of the so-called synthetic rubbers such as polymerized butadiene, polymerized chloroprene, rubber hydrochloride, or polyethyline sulfide. Each has the property of being elastic and resistant to attack by lubricants, water and other fluids to which a seal is subjected.

It will be readily appreciated from the above description and the disclosure in the drawing that the invention comprehends a novel lubricant seal and one which effectively excludes dust and other foreign matter. The seal may be readily installed wherever a seal of this type is required.

Having thus disclosed the invention, I claim:

1. In an oil seal, a unitary sealing element therefor comprising a body layer of synthetic rubber, a layer of synthetic rubber suitably loaded with graphite for reducing friction and forming the sealing surface for rotative contact with a member to be sealed, and an intermediate layer of fabric for uniting said layers of synthetic rubber and for preventing creeping of said last mentioned layer and maintaining said layer in confined relation, said last mentioned layer being of substantial thickness whereby the fabric is maintained out of contact with the member to be sealed.

2. In an oil seal, a retaining shell and a unitary sealing element therefor comprising a layer of moldable elastic material bonded directly to the opposite sides of the shell and forming a backing for the sealing element, a layer of fabric on one face of said layer of elastic material and a layer of synthetic rubber of substantial thickness molded to the fabric and forming the sole contacting and sealing surface, said intermediate layer of fabric bonding the elastic and synthetic layers together and confining and preventing creeping of the layer of synthetic rubber.

THOMAS O. KOSATKA.